United States Patent [19]

Gillingham

[11] Patent Number: 4,622,995

[45] Date of Patent: Nov. 18, 1986

[54] INTEGRAL VALVE AND TANK ASSEMBLY FOR PULSE-JET AIR CLEANERS

[75] Inventor: Gary R. Gillingham, Prior Lake, Minn.

[73] Assignee: Donaldson Company, Inc., Minneapolis, Minn.

[21] Appl. No.: 711,663

[22] Filed: Mar. 14, 1985

[51] Int. Cl.$^4$ ............................................. B01D 46/04
[52] U.S. Cl. ..................................... 137/590; 251/45; 15/405; 137/204; 417/76
[58] Field of Search ................... 137/590, 203, 204; 251/45; 417/76, 87, 151, 160; 220/DIG. 6; 15/405; 55/302

[56] References Cited

U.S. PATENT DOCUMENTS

| | | | |
|---|---|---|---|
| 757,200 | 4/1904 | Kettle | 417/76 |
| 2,326,687 | 8/1943 | Sanford | 137/204 |
| 2,939,477 | 6/1960 | Kaldobsky | 137/204 |
| 3,254,805 | 6/1966 | Barger | 137/204 |
| 4,033,732 | 7/1977 | Axelsson et al. | 137/590 |
| 4,244,554 | 1/1981 | DiMauro et al. | 251/45 |
| 4,331,459 | 3/1985 | Copley | 55/302 |
| 4,449,644 | 5/1984 | Matson | 251/45 |

OTHER PUBLICATIONS

Drawing E609752, Goyen Controls Company, Assembly Arrangement, 3/5/82.
Drawing HVA-180-319, Automatic Switch Co., Remote Pilot Construction.
Baumeister, Theodore, Ed. and Lionel S. Marks, Ed.; Mechanical Engineers' Handbook, 3/1958, pp. 3-59 to 3-65.
Gast Catalog No. 5-30, Mar. 1982.

Primary Examiner—Alan Cohan
Assistant Examiner—John A. Rivell
Attorney, Agent, or Firm—Merchant, Gould, Smith, Edell, Welter & Schmidt

[57] ABSTRACT

An integral valve and tank assembly (12) for a pulse-jet air cleaner includes a discharge pipe (22) connected to and extending directly into a tank (14). The inlet end (28) of the discharge pipe (22) terminates adjacent to a relatively larger opening (30) in the tank wall (14b), over which a diaphragm assembly (32), cover (34), and compression spring (38) are mounted so as to provide improved constructional and operational efficiency.

5 Claims, 3 Drawing Figures

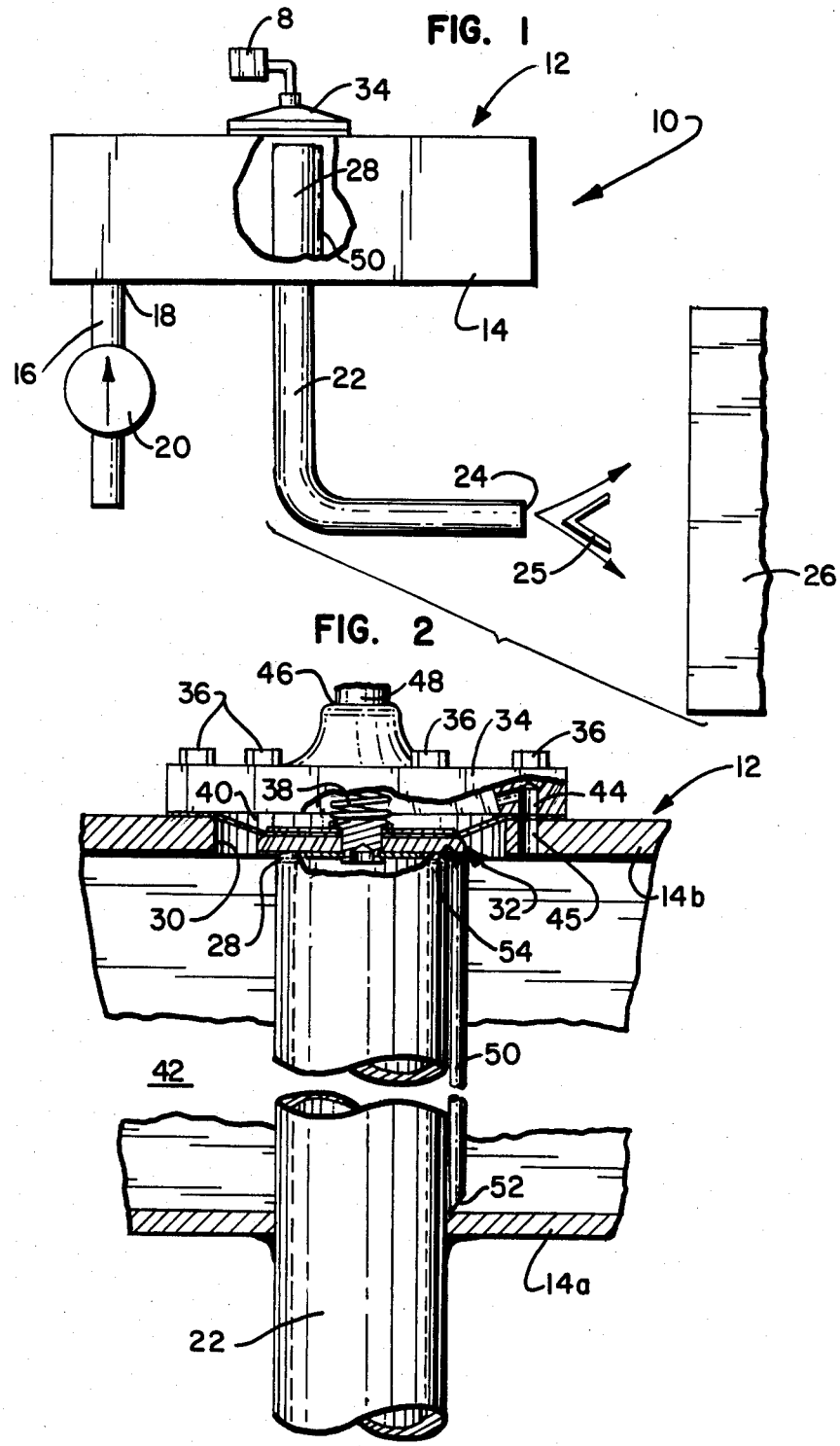

INTEGRAL VALVE AND TANK ASSEMBLY FOR PULSE-JET AIR CLEANERS

TECHNICAL FIELD

The present invention relates generally to a combined diaphragm valve and compressed air tank assembly. More particularly, this invention concerns a high performance integral valve/tank assembly for pulse-jet air cleaners featuring compact construction and more efficient operation.

BACKGROUND ART

Fluid filters must be periodically cleaned and/or replaced to prevent undue buildup of dirt and particulate matter which would adversely affect proper operation. For example, pulse-jet air cleaners are typically used in applications requiring treatment of large volumes of air. Cleaning is accomplished by periodically pulsing air through the filters in a direction opposite to the normal airflow direction to effect backflushing during operation of the system and thus extend the recommended service interval between removal and replacement of the filters. For example, U.S. Pat. No. 4,331,459 to Donaldson Company, the assignee hereof, shows a representative self-cleaning pulsed air cleaner.

Such pulse-jet air cleaners generally include a reservoir or tank of compressed air having an outlet connected by a discharge pipe to a diaphragm valve and onto a nozzle or orifice positioned to direct the air against the filter to effect cleaning. The diaphragm valve is normally closed, but is controlled by a pilot valve to open momentarily and release a large volume of air at high velocity which is directed toward a filter opening, thereby generating the necessary cleaning energy. The air tank is charged by a compressor.

The pulse-jet air cleaners of the prior art have been satisfactory for most industrial applications, but are not suited for certain high-performance industrial applications and vehicular applications requiring maximum cleaning energy in minimum space. More critical design constraints are present in high-performance applications. For example, some vehicular applications can require up to twenty times the cleaner size reduction as compared to industrial pulse-jet air cleaners. In addition, the media velocities in vehicular air cleaners are usually higher, which in turn requires higher cleaning energy, but the available compressed air supply is likely to be more limited than that available in industrial applications. The prior pulse-jet air cleaners tend to be relatively bulky, expensive, difficult to assemble, and inefficient due to flow losses resulting from their construction. There are thus several drawbacks to the use of the prior pulse-jet air cleaners in high performance applications.

A need has thus arisen for an improved pulse-jet air cleaner which is suitable for use in either industrial or vehicular applications requiring higher performance, but which does not have the bulk, limited cleaning energy and other drawbacks associated with the prior art.

SUMMARY OF INVENTION

The present invention comprises an improved pulse-jet air cleaner which overcomes the foregoing and other difficulties associated with the prior art. In accordance with the invention, there is provided an integral pulse valve and tank assembly for a pulse-jet air cleaner which is of compact, less expensive construction, and which provides better operating efficiency so that more cleaning energy can be generated with a given supply of compressed air. The integral valve and tank assembly comprises a reservoir or tank with a discharge pipe extending through one side of the tank. The inlet end of the discharge pipe is positioned adjacent to a relatively larger opening in another side of the tank, over which a diaphragm assembly and cover are secured. A compression spring or other means is provided between the diaphragm assembly and the cover for normally closing the inlet end of the discharge pipe, and a bleed passage is provided for equalizing the pressures across the diaphragm assembly between the upper chamber defined between the cover and the diaphragm assembly and the lower chamber, which is the entire interior of the tank. A pilot valve is connected to the cover for selectively relieving pressure in the upper chamber whereby the diaphragm opens momentarily so that a charge of air is released from the tank directly into the discharge pipe without the entrance losses associated with the separate components of the prior art.

BRIEF DESCRIPTION OF DRAWINGS

A better understanding of the invention can be had by reference to the following Detailed Description in conjunction with the accompanying Drawings, wherein:

FIG. 1 is a side view (partially cutaway) of the pulse-jet air cleaner incorporating the invention;

FIG. 2 is an enlarged partial sectional view of the integral tank and valve of the first embodiment of the invention, showing certain internal constructional details.

DETAILED DESCRIPTION

Figure 3:
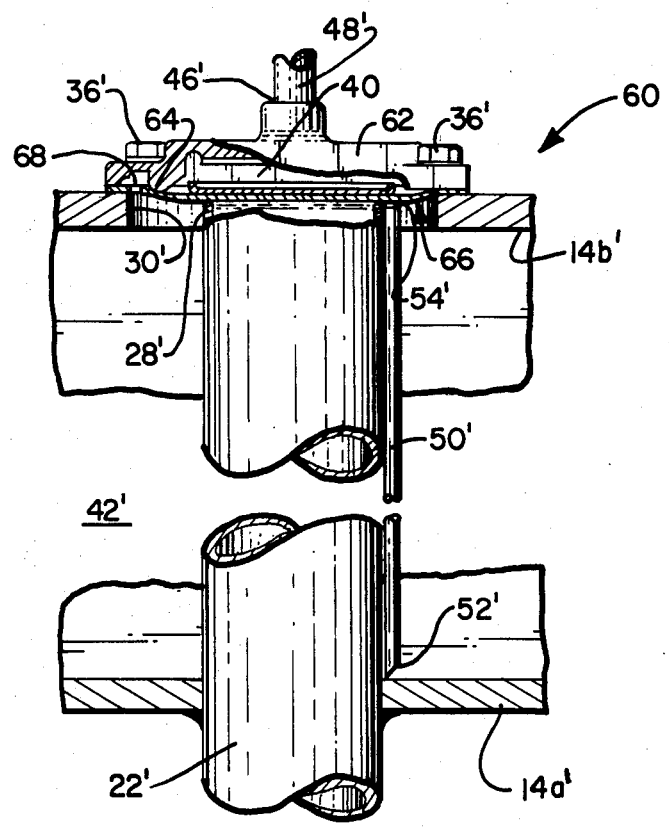
FIG. 3 is an enlarged partial sectional view of the integral tank and valve of the second embodiment of the invention, showing certain internal constructional details.

Referring now to the Drawings, wherein like reference numerals designate like or corresponding elements throughout the views, and particularly referring to FIG. 1, there is shown a pulse-jet air cleaner 10 incorporating the integral valve/tank 12 of the invention. Although the integral valve/tank is particularly adapted for use with pulse-jet air cleaners, it will be understood that the invention can also be incorporated into other fluid flow applications. As will be explained more fully hereinafter, the integral valve/tank of the invention results in better operating and constructional efficiency.

Other than the integral tank and valve assembly 12, the pulse-jet air cleaner 10 is of generally conventional arrangement. The assembly 12 includes a tank 14 which is charged with compressed air via a supply pipe 16 connected to an inlet 18 by a compressor 20 which draws in ambient air from atmosphere. The tank 14 is connected via a discharge pipe 22 to a nozzle or orifice 24 positioned and arranged to direct pulses of air released from the tank across a diverter 25 and against a filter 26 in a direction opposite to normal airflow through the filter to effect periodic, partial cleaning by means of a back-flushing action. Some applications utilize a venturi (not shown) instead of diverter 25.

In contrast to the prior art, however, the valve and tank assembly 12 of the invention eliminates the pipe connection between the tank and valve, as well as the flow losses associated therewith, in order to achieve better performance with a given supply pressure in a more compact, less expensive construction.

In particular, and referring now to FIGS. 1 and 2, the discharge pipe 22 is connected directly to the tank 14, and extends in sealing engagement through one wall 14a of the tank so that the inlet end 28 of the discharge pipe is positioned adjacent to a relatively larger opening 30 provided in another wall 14b of the tank. Pipe 22 and tank 14 may be secured together by welding as shown. For example, the inside diameter of opening 30 can be about 2½ inches, with pipe 22 having an inside diameter of about 1⅛ inches and an outside diameter of about 1⅜ inches. The walls 14a and 14b are shown opposite each other with that portion of pipe 22 internal to tank 14 being straight to minimize flow losses. Depending upon the shape of tank 14, however, the entry point of discharge pipe 22 and location of opening 30 can be in adjacent walls or different portions of the same wall of the tank, with an elbow in the pipe.

The inlet end 28 of the discharge pipe 22 is preferably rounded as shown and serves as the seat for a diaphragm assembly 32 provided over the opening 30 and secured in place on the tank 14 by a rigid cover 34 and bolts 36. As shown, the diaphragm assembly 32 actually comprises an assembly of a valve seat element centrally secured to a resilient diaphragm element. A compression spring 38 is provided for normally biasing the diaphragm assembly 32 into sealing engagement with the inlet end 28 of the supply pipe 22 so that the valve portion of the assembly 12 is normally closed.

The diaphragm assembly 32 divides the valve and tank assembly 12 into two chambers. A small chamber 40 is defined between the diaphragm assembly 32 and the cover 34. On the other side of the diaphragm assembly 32, there is defined a relatively large chamber 42 which in effect corresponds to the interior of the tank 14. A bleed passageway 44 is provided in the cover 34 in communication with a port 45 in the tank wall 14b for equalizing the pressures in chambers 40 and 42 across the diaphragm assembly 32.

The cover 34 also includes a port 46 open to chamber 40 and connected to a normally closed pilot valve 48. The pilot valve 48 may be of the solenoid-actuated type available from various commercial sources, such as for example, Goyen Controls Company of Sidney, Australia. When the pilot valve 48 is actuated, relief of some pressure from the chamber 40 upsets pressure equalization across the diaphragm assembly 32 such that it is raised off of the inlet end 28 by the relatively higher pressure in the tank chamber 42, thereby allowing a pulse of compressed air to flow across the opening 30 and the inlet end and on through the discharge pipe 22 directly to the nozzle or orifice 24 until pressure equilibrium is restored across the diaphragm assembly.

In contrast to the separate tank, discharge pipe and pulse valve of the prior art, it will thus be apparent that the present invention eliminates the intermediate pipe connection between the tank and valve, as well as the flow losses associated therewith. A major portion of the energy in a compressed air tank can be wasted through entrance flow losses and it will be appreciated that this comprises a significant feature of the present invention, which in turn enables either better cleaning with a given supply of compressed air, or a reduction in the supply of compressed air required in order to achieve a given amount of cleaning energy.

If desired, the tank/valve assembly 12 can be provided with an aspirator tube 50 for removing any accumulated moisture from tank 14 on a substantially continuous, automatic basis upon each actuation of the valve portion. The tube 50 is spot welded or otherwise secured to the internal portion of pipe 22; extending between an inlet end 52 located at a point in tank 14 where moisture would tend to accumulate, and an outlet end 54 located at a point adjacent the pipe end 28, where the air velocity and pressure are such that moisture is drawn upon actuation of the valve portion. My copending application filed concurrently herewith entitled ASPIRATOR FOR PULSE-JET AIR CLEANER, the disclosure of which is incorporated herein by reference, illustrates the use of a similar aspirator tube in a conventional tank. This also comprises an important but optional feature of the present invention.

FIG. 3 shows an integral tank and valve assembly 60 incorporating a second embodiment of the invention. The assembly 60 includes component parts which are substantially identical in construction and operation to component parts of the assembly 12 illustrated in FIG. 2. Such parts have been designated with the reference numerals utilized herein before, but have been differentiated therefrom by means of prime (') notations.

In contrast to the tank and valve assembly 12 which utilizes a spring 38 for urging the diaphragm assembly 32 into sealing engagement with the inlet end 28 of the discharge pipe, the assembly 60 includes a rigid cover 62 secured by bolts 36' over opening 30' in the tank wall 14b'. An annular flange 64 is provided on the underside of the cover 62 for engaging the diaphragm assembly 66 and resiliently biasing it into normal sealing engagement with the inlet end 28' of the discharge pipe 22'. The diaphragm assembly 66 is of different construction from the diaphragm assembly 32, but still includes an assembly of a valve seat element centrally secured to a resilient diaphragm element. Instead of a bleed passageway in the cover and a port in the tank wall, at least one port 68 is provided in the diaphragm element of the diaphragm assembly 66 for pressure equalization between chambers 40' and 42'. Apart from these structural differences, the tank and valve assembly 60 of FIG. 3 functions substantially the same as the assembly 12 shown in FIG. 2.

The improved performance of the present invention has been experimentally confirmed. For example, in the case of a 550 cubic inch tank charged to 100 psi, a 100 millisecond discharge pulse duration resulted in a post-pulse tank pressure of 35 psi with the separate construction of the prior art, but only 24 psi with the integral contruction herein. In other words, the present invention resulted in more cleaning energy with the same compressed air supply. It is contemplated that the tank volume would normally be from 300 cubic inches to 1½ cubic feet, and the supply pressure would normally range between 50 psi and 150 psi in practicing this invention.

From the foregoing, it will thus be appreciated that the present invention comprises an integral valve and tank assembly for a pulse-jet air cleaner which has numerous advantages over the prior art. Improved efficiency is achieved by combining the tank and valve in such a way so as to eliminate an unnecessary pipe connection and the flow losses associated therewith. This also permits more compact, less expensive construction. Other advantages will be evident to those skilled in the art.

Although particular embodiments of the invention have been illustrated in the accompanying Drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following Claims.

What is claimed is:

1. An integral valve and tank assembly for a pulse-jet air cleaner, comprising:

a tank of compressed air;

a discharge pipe extending in sealed engagement through said tank and having an inlet end opening of predetermined size disposed adjacent to and inside a relatively larger opening formed in one wall of said tank;

pulse valve means mounted over the tank opening and including a diaphragm normally biased into sealing engagement with the inlet end of said discharge pipe, for selectively releasing a pulse of air from said tank directly through said pipe; and an aspirator tube secured inside said tank and having inlet and outlet ends, the inlet end terminating at a point in said tank where moisture tends to collect, and the outlet end terminating at a predetermined point within the tank opening and adjacent the inlet end of said discharge pipe where the airflow upon actuation of said pulse valve means is of high velocity and low pressure so that moisture will be drawn out and discharged on a substantially continuous basis.

2. An integral valve and tank assembly for a pulse-jet air cleaner, comprising:

a tank of compressed air defining a first chamber;

a discharge pipe extending in sealed engagement through said tank and having an inlet end opening of predetermined size disposed adjacent to and inside a relatively larger opening formed in one wall of said tank;

a diaphragm disposed over the opening in said tank and movable into and out of sealing engagement with the inlet end of said discharge pipe;

a cover secured to said tank over said diaphragm to define a relatively smaller second chamber;

means defining a passageway interconnecting the first and second chambers for pressure equalization;

means disposed in said second chamber for normally biasing said diaphragm into sealing engagement with the inlet end of said discharge pipe;

said cover including a control port adapted for connection to a pilot valve for selective momentary relief of pressure in the second chamber so that said diaphragm is urged out of sealing engagement with the inlet end of said pipe responsive to the pressure in said first chamber, releasing a pulse of air through said discharge pipe; and an aspirator tube secured inside said tank and having inlet and outlet ends, the inlet end terminating at a point in said tank where moisture tends to collect, and the outlet end terminating at a predetermined point within the tank opening and adjacent the inlet end of said discharge pipe where the airflow upon actuation of said pulse valve means is of high velocity and low pressure so that moisture will be drawn out and discharged on a substantially continuous basis.

3. The integral valve and tank assembly of claim 2, wherein the portion of said discharge pipe extending inside said tank is substantially straight.

4. The integral valve and tank assembly of claim 2, wherein said biasing means comprises a compression spring disposed between said cover and said diaphragm.

5. The integral valve and tank assembly of claim 2, wherein said biasing means comprises an annular flange on said cover for normally resiliently urging said diaphragm into sealing engagement with the inlet end of said discharge pipe.

* * * * *